US009286400B2

(12) United States Patent
Chakra et al.

(10) Patent No.: US 9,286,400 B2
(45) Date of Patent: Mar. 15, 2016

(54) PRESENTING TAG CLOUDS BASED ON USER INFORMATION

(75) Inventors: Al Chakra, Apex, NC (US); Yongcheng Li, Cary, NC (US); Yuping C. Wu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 12/122,171

(22) Filed: May 16, 2008

(65) Prior Publication Data

US 2009/0287989 A1 Nov. 19, 2009

(51) Int. Cl.
*G06F 17/00* (2006.01)
*G06F 17/30* (2006.01)
(52) U.S. Cl.
CPC .............................. *G06F 17/30867* (2013.01)
(58) Field of Classification Search
None
See application file for complete search history.

(56) References Cited

U.S. PATENT DOCUMENTS

| 7,885,986 | B2* | 2/2011 | Anderson et al. | 707/805 |
| 2002/0188949 | A1* | 12/2002 | Wang et al. | 725/46 |
| 2008/0059897 | A1* | 3/2008 | Dilorenzo | 715/764 |
| 2009/0012988 | A1* | 1/2009 | Brown | 707/102 |

OTHER PUBLICATIONS

Beckett, Dave "Semantics Through the Tag", *XTech 2006: Building Web 2.0*, http://xtech06.usefulinc.com/schedule/paper/135,(May 2006).
Yury "Implementing Tag Cloud—The Nasty Way (Part 2)", *Scalable Corner—Software Development Blog*, scalablecorner.blogspot.com/2007/06/implementing-tag-cloud-nasty-way-part-2.html,(Jun. 16, 2007).
Lamantia, Joe "Tag Clouds: A New User Interface", joelamantia.com, http://www.joelamantia.com/blog/archives/ideas/tag_clouds_a_new_user_interface.html,(May 3, 2006).
Lamantia, Joe "Tag Clouds Posts", joelamantia.com, http://www.joelamantia.com/blog/archives/cat_tag_clouds.html,(Jul. 22, 2007).
Quintarelli, Emanuele et al., "FaceTag: Integrating Bottom-up and Top-down Classification in a Social Tagging System", *American Society for Information Science and Technology: Bulletin*, Jun./Jul. 2007, http://www.asis.org/Bulletin/Jun-07/quintarelli_et_al.html,(Jun./Jul. 2007).
Brown, Simon "Java annotations in a Web 2.0 world", *Coding the architecture*, http://www.simongbrown.com/blog/2006/09/05/java_annotations_in_a_web_2_0_world.html,(Sep. 5, 2006).
Francis, Mark N., "Marking Up a Tag Cloud", 24_ways.org, http://24ways.org/2006/marking-up-a-tag-cloud,(2006).

* cited by examiner

*Primary Examiner* — Keith Bloomquist
(74) *Attorney, Agent, or Firm* — DeLizio Law, PLLC

(57) ABSTRACT

In some embodiments, a method comprises detecting a request to display a tag cloud, where the tag cloud includes a plurality of tags and the tags hyperlink to related web content. The method can also comprise determining a user's interests and preferences based on the information provided by the user. The method can include using the information to determine the tags relevant to the user's preferences and interests. The method can also include displaying the tags in the tag cloud.

20 Claims, 5 Drawing Sheets

PRESENTING TAG CLOUDS BASED ON USER INFORMATION

TECHNICAL FIELD

Embodiments of the inventive subject matter generally relate to the field of web environments, and more particularly, to methods of presenting tag clouds in web environments.

BACKGROUND

A website can use tag clouds to direct users to content on the website. Tag clouds typically contain a set of related tags, where each tag is a keyword that acts as a hyperlink to content on the website. Clicking on tags can lead to web pages on the website or to a series of hyper-links pointing to web pages on other websites. Typically, websites assign each tag of a tag cloud a weight indicating popularity. Tag weights can be based on how many times users search for content related to the tag or weight can be based on the number of times different users choose to tag content using a particular keyword.

SUMMARY

In some embodiments, a method comprises detecting a request to display a tag cloud, where the tag cloud includes a plurality of tags and the tags hyperlink to related web content. The method can also include determining a user's interests and preferences based on the information provided by the user. The method can comprise using the information to determine the tags relevant to the user's preferences and interests. The method can also include displaying the tags in the tag cloud.

BRIEF DESCRIPTION OF THE DRAWINGS

The present embodiments may be better understood, and numerous objects, features, and advantages made apparent to those skilled in the art by referencing the accompanying drawings.

FIG. 4 is a conceptual diagram illustrating a screen shot depicting a user customized tag cloud, according to some embodiments of the invention.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Introduction

Tags and tag clouds have at least two functions: 1) describing web content, and 2) locating web content. In describing content, users can browse through a website and "tag" content that appeals to them (e.g., web pages, pictures, video, etc). In some instances, users upload and tag their own content, so others can find it. To facilitate tagging, websites may provide users with a graphical user interface (GUI) through which they can apply tags to content. In some instances, users can apply multiple tags to the same content and they can post reviews of the content.

As noted, websites also use tags and tag clouds to help users locate content. In response to a keyword search or other user input, a website may present a tag cloud to help users find desired content. Tag clouds typically contain a set of related tags, where the tags can be text, such as keywords, that describe web content. In some instances, each tag is assigned a weight indicating the tag's popularity (i.e., how often users use the tag to access content). For example, the most popular tags can be prominently displayed in striking colors or bigger fonts. Relevant but less popular tags can be displayed in smaller fonts. In some instances, a tag cloud's tags appear in alphabetical order or by popularity.

Although weighting, color coding, alphabetizing, etc. may be helpful, such measures may not be enough to help users find desired content. For example, a software company's website may present a tag cloud including tags for all its latest products and their technical specifications. A user with a finance background may not be interested in the technical aspects of the products, but may want to view web pages that describe the company from a finance point of view (e.g., profit-loss profile, rate of growth, etc). As a result, users may want a system that allows them to customize tag clouds based on their interests. For example, the software company's website may present one tag cloud for people interested in software and a different tag cloud (i.e., a different tags set) for people interested in finance. Some embodiments of the inventive subject matter allow users to customize tag clouds based on their interests. These and other embodiments are described in more detail below.

Example Architecture and Operating Environments

Figure 1:
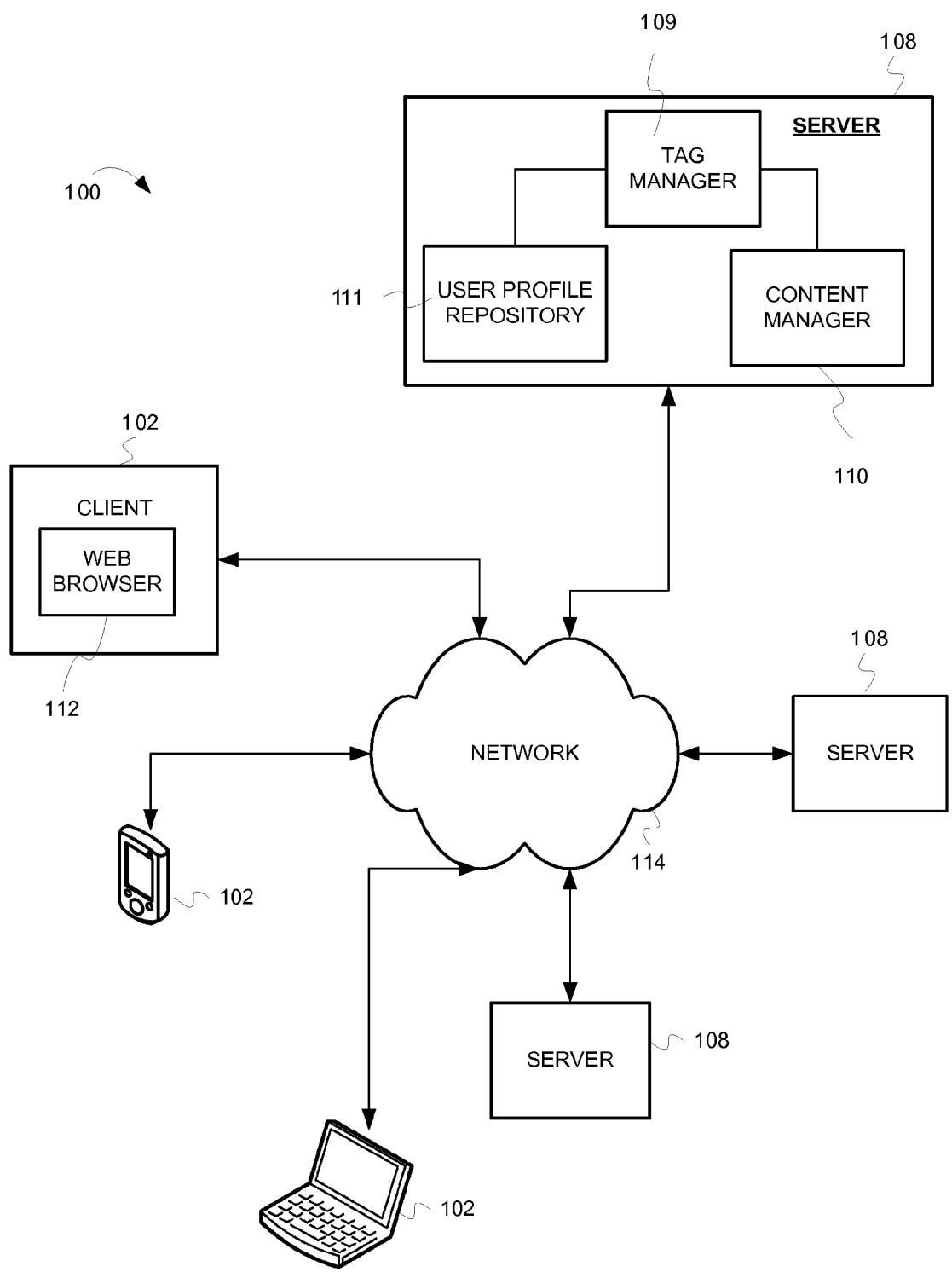
FIG. 1 is a block diagram illustrating a client-server system configured to customize and present tag clouds according to some embodiments of the invention.
Figure 3:
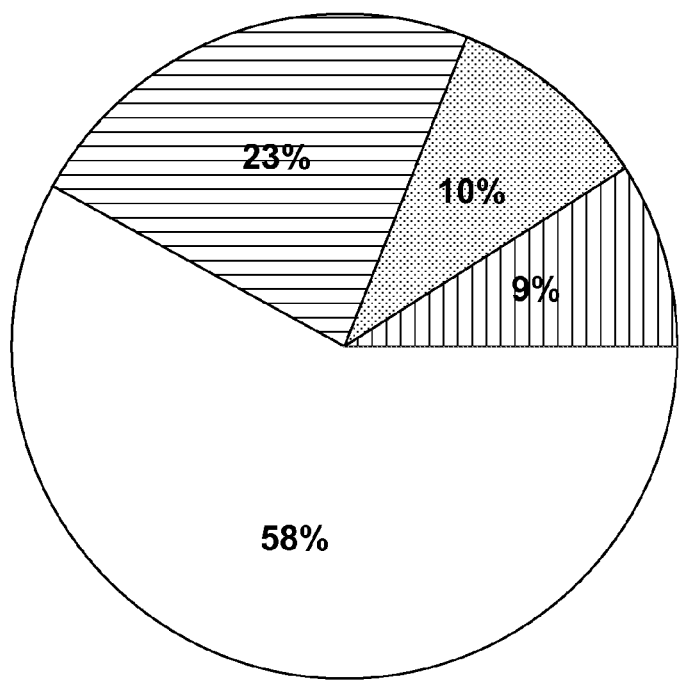
FIG. 3 is a pie diagram illustrating customizable user preferences based on percentage modification according to some embodiments of the invention.
Figure 3:
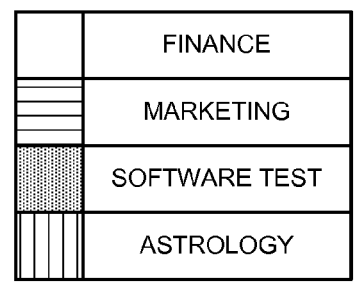

FIG. 1 is a block diagram illustrating a client-server system configured to customize and present tag clouds according to some embodiments of the invention. As shown in FIG. 1, the system 100 includes servers 108 and clients 102. The server 108 includes a tag manager 109, a user profile repository 111, and a content manager 110. The content manager 110 includes code and other software for presenting a website to the clients 102. The user profile repository 111 includes information about users' preferences, which can include age, location, interests (e.g., music, finance, software, etc), etc. In some instances, users step through an electronic questionnaire inquiring about their interests and preferences. In some embodiments, the questionnaire asks users to assign weights to subjects in a pie chart to indicate user preferences. FIG. 3 is a pie diagram illustrating customizable user preferences, according to some embodiments of the invention. In the example shown in FIG. 3, the user has weighted preferences in the order of finance (58%), marketing (23%), software testing (10%), and astrology (9%).

Figure 4:
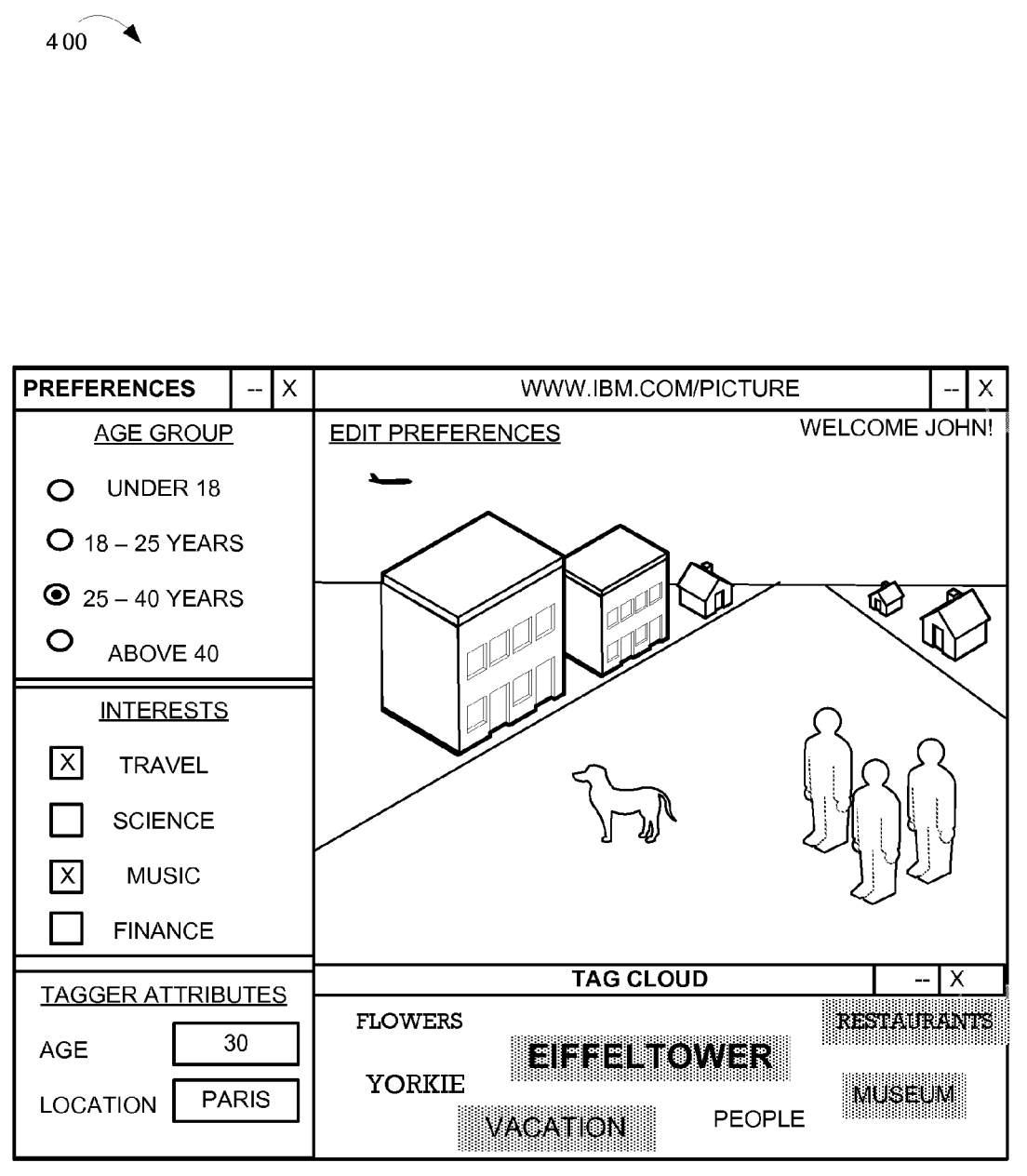

Users may desire different types of content, such as content indicating what others of similar age thought about a movie, what experts thought about an article, what gamers thought about a popular video game, etc. Thus, the user preferences can identify what attributes the user prefers in content sources. For example, before a user visits a French restaurant in Paris, the user may want to read restaurant reviews by authors from Paris, as the user finds authors from Paris most credible. Thus, in some embodiments, the electronic questionnaire allows users to indicate what attributes they prefer in an author (i.e., person who wrote a webpage). The author attributes can include the author's name, age, interests, geographic region, publication date, etc. In some instances, the user's preferences can also indicate what attributes they prefer in people who tag web pages. For example, on a music related website, users may want to view tags from people who play a particular musical instrument or from people who have studied music. FIG. 4 is a conceptual diagram illustrating a screen shot depicting a user customized tag cloud, according to some embodiments of the invention. In the example shown in FIG. 4, the user has selected age (e.g., 25 to 40 years), interests (e.g., travel and music), and entered tagger attributes (e.g., tagger's age and location). The tag manager 109 can compare the information in the user's profile to attributes associated with webpage authors, taggers, or others to identify the relevant tags for a tag cloud.

In some embodiments, user profiles are updated based on website use, and not just how users answer the questionnaires. For example, the web browser 112 may have a monitoring system (e.g., in the form of a plug in) to determine websites that users visit most frequently. For instance, if the user often visits a science website, the web browser 112 may send "science and technology" as one of the user's interests, even if the user has not specifically identified this category while answering the questionnaire.

The tag manager 109 can access the user profile repository 111 to determine the user's interests and personal preferences and accordingly select the most relevant tags for a tag cloud. The content manager 110 can send these tags along with data and/or code to enable clients 102 to display the website along with the tag cloud. The clients 102 can be in the form of personal computers, personal digital assistants (PDAs), cellular phones, or any other suitable computing device. The clients 102 include web browsers 112 or other software to present the tag clouds and other content from the content manager 110.

The servers 108 and the clients 102 are connected to the communication network 114. The network 114 can include any technology suitable for passing communication between the clients and servers (e.g., Ethernet, 802.11n, SONET, etc.). Moreover, the network 114 can be part of other networks, such as cellular telephone networks, public-switched telephone networks (PSTN), cable television networks, etc. Additionally, the server 108 and clients 102 can be any suitable computing devices capable of executing software in accordance with the embodiments described herein.

Example Tag Manager Operations

This section describes operations associated with some embodiments of the invention. The flow diagrams will be described with reference to the architectural block diagram presented above. However, in some embodiments, the operations can be performed by logic not described in the block diagrams; furthermore, some embodiments can perform more or less than the operations shown in any flow diagram. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 2:
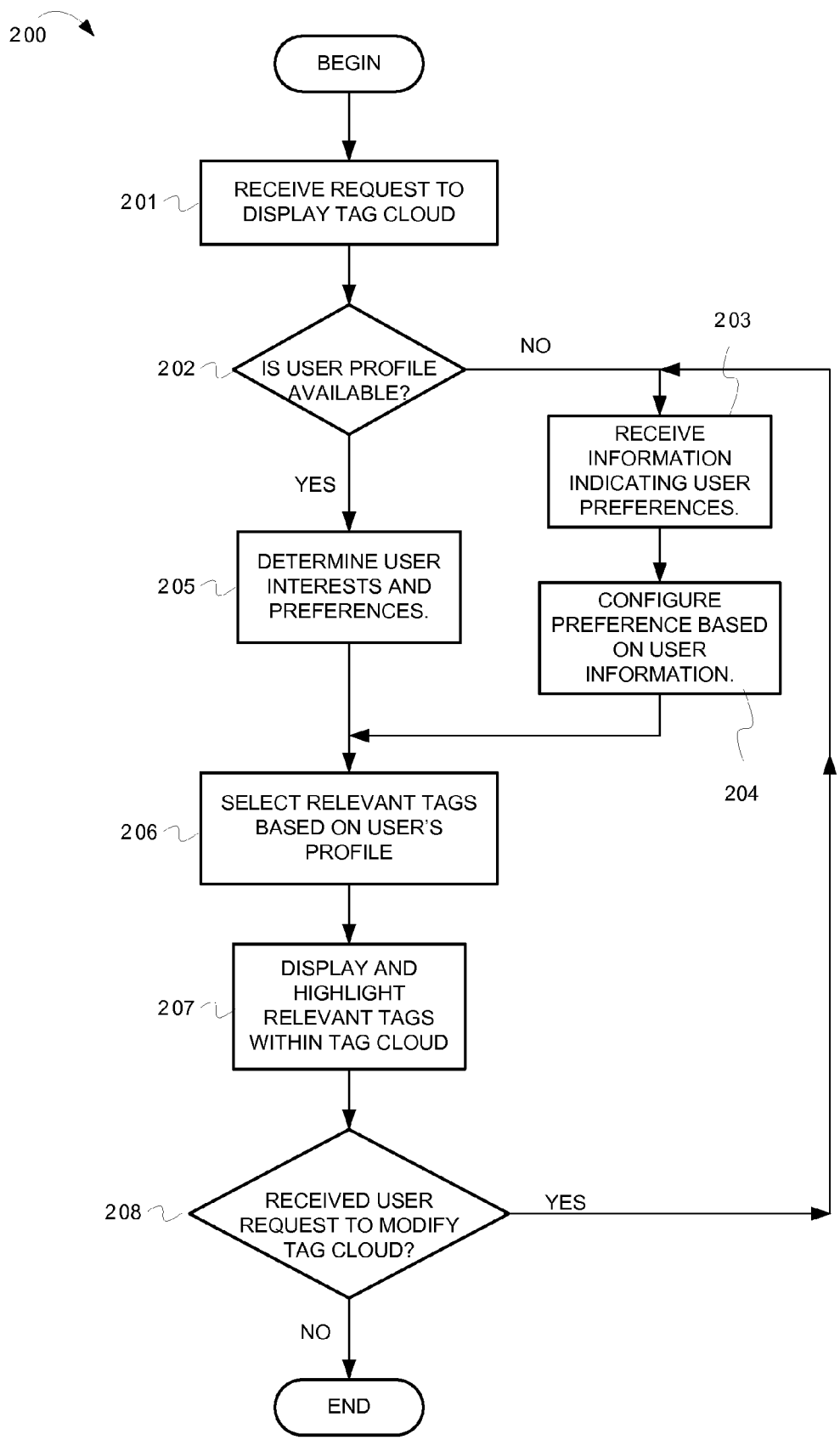
FIG. 2 is a flow diagram illustrating the operations for customizing a tag cloud based on user preferences, according to some embodiments of the invention.

FIG. 2 is a flow diagram illustrating the operations for customizing a tag cloud based on user preferences, according to some embodiments of the invention. The following discussion will describe the flow 200 with reference to the system of FIG. 1. The flow diagram 200 begins at block 201.

At block 201, a tag manager 109 receives a request to display a tag cloud. In some instances, a user may request (via the web browser 112) a tag cloud by clicking on a hyperlink, entering a search query, etc. In some embodiments, the content manager 110 generates the request as part of a user login procedure. As a result, some embodiments do not perform block 201. The flow continues at block 202.

At block 202, the tag manager 109 determines whether a profile exists for the user associated with the request received at block 201. In some embodiments, when the user accesses the system (e.g., via a login page on the website), the user provides a username or other unique identifier. In turn, the content manager 110 can use the username to identify the user's profile in the user profile repository 111. The tag manager 109 can use the user's profile to create an initial tag cloud based on the user's preferences. The tag manager 109 can interface with the content manager 110 to display this initial tag cloud on the client's web browser 112. However, if the user does not have a profile or has not logged in, the content manager 110 and the tag manager 109 can work together to dynamically determine the user's interests, find the relevant tags, and display the relevant tags in a tag cloud on the webpage. If the user has a profile on the server, the flow continues at block 205. Otherwise, the flow continues at block 203.

At block 205, the tag manager 109 accesses the user's profile 111 and determines the user's interests and preferences. A user's profile can indicate that a user is interested in music, gardening, science, astrology, finance, etc. The profile can also indicate user preferences and attributes, such as favorite websites, favorite foods, favorite location, age group, gender, preferred author attributes, preferred tagger attributes, etc. Once the tag manager 109, determines the user's interests and preferences, the flow continues at block 206.

At block 206, the tag manager 109 uses the information about the user's preferences to select tags that are relevant to the user. In some instances, the tag manager 109 can compare the user's interests and preferences with the interests and preferences of a tagger (i.e., user who added a tag) or webpage author to identify tags most relevant to the user. The tag manager 109 interfaces with the content manager 110 to display the most relevant tags in the tag cloud. Once the tag manager identifies the relevant tags, the flow continues at block 207.

At block 207, the tag manager 109, displays and highlights the relevant tags in the tag cloud. In some instances, the tag manager may highlight relevant tags. In other instances, the tag manager may increase the font size and change the color of the relevant tags. The tag manager can also assign different colors and different fonts to tags based on the user's preferences. The tag manager 109 can base its tag selection on the pie chart 300 and display tags such that 58% of the tags relate to finance, 23% of the tags relate to marketing, and so on. Additionally, the finance related tags may appear in blue, the marketing related tags may appear in red, and so on. FIG. 4 shows an example of a tag cloud displayed at the bottom of the web browser. The tags have different fonts and font sizes and the tags related to travel are highlighted. The most popular tag, "eiffeltower," appears in the center of the tag cloud, highlighted, and in the largest font size. After the tags are presented, the user can click on a tag in the tag cloud. The tag may lead to the most popular web page (as voted on by other users, taggers, etc) related to the tag. In some embodiments, the tags may be hierarchical. Thus, clicking on a tag may reveal links to web pages (e.g., arranged in order of popularity, based on user preferences, etc) or even other related tag clouds. The links to the related web pages can also be customized based on the user's profile and preferences. Referring back to FIG. 2, after the relevant tags have been displayed on the client's browser, the flow continues at block 208.

At block 208, the tag manager 109 receives a user request to modify the tag cloud. In one embodiment, a user with a pre-existing profile may modify his settings and preferences "on the fly" without having to change the profile. For example, assuming that the user's initial preference settings were in accordance with FIG. 3, the user may want to quickly view music related tags without making permanent modifications to his profile. The tag manager 109 can allow users to modify their profiles dynamically for the duration of a session, without making permanent changes to their profiles. Alternatively, the tag manager 109 can provide the user with an option to make these modifications permanent. In FIG. 2, if the user wishes to dynamically modify or further tweak the tag cloud, the flow continues at block 203. Otherwise, the flow ends without any further modifications to the tag cloud.

At block 203, the tag manager 109 receives information indicating the user's preferences. There are two situations in which the flow 200 moves to block 203: 1) coming from block 202, the tag manager 109 may not have access to the user's profile (e.g., because the user is at a public computer and does not wish to log onto the website); 2) coming from block 208, the user may have a profile but may want to temporarily modify the profile information "on the fly." The user can use the website as an interface to indicate his interests by clicking on check boxes, clicking on buttons, entering keywords in a textbox, selecting items from a drop down menu, etc. In some instances, the tag manager 109 can ask the user (via the website) to modify a pie chart (e.g., see FIG. 3) to indicate the amount of emphasis the user wishes to place on each of the categories of interest. The user may have indicated his interest in finance, marketing, software testing, and astrology. The tag manager 109 allows the user to assign weights, percentages, and priorities to different categories to indicate the level of interest through the customizable pie chart 300. The web browser 112 can send the user's preference information (e.g., in an XML file) to the server 108 via the network 114. After the tag manager 109 receives information about the user's preferences, the flow continues at block 204.

At block 204, the tag manager 109 uses the information selected or entered by the user to configure the user's preferences. This information may include the user's interests, current location, age group, preferred attributes of taggers, preferred attributes of authors, etc. In some instances, the user may also have the option of storing these preferences for use at a later time. The flow continues at block 206, where the tag manager 109 can use this new information and determine the tags most relevant to the user.

Example Server Architecture

Figure 5:
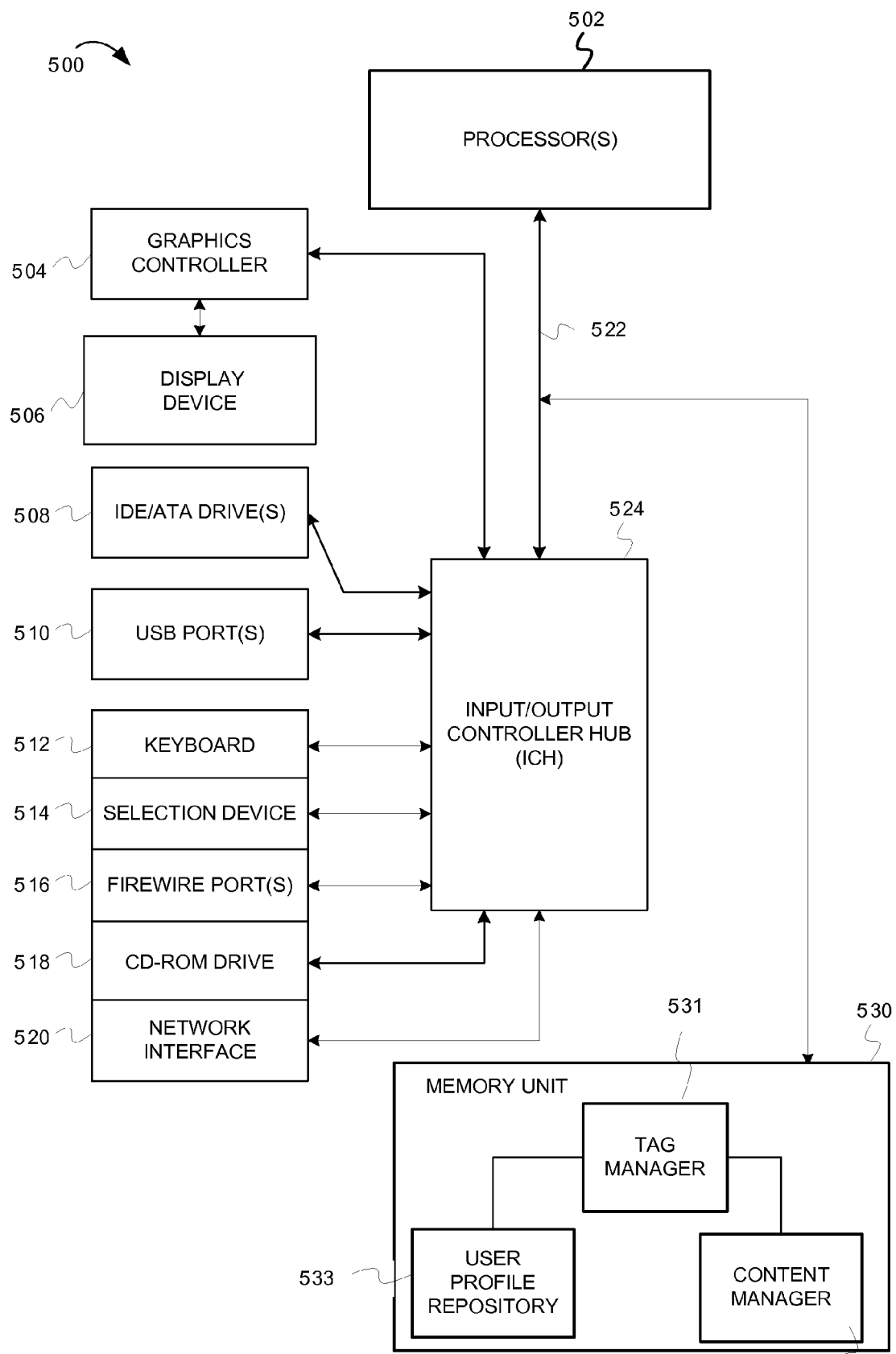
FIG. 5 is a block diagram illustrating a computer system configured to modify and display tag clouds based on user preferences according to some embodiments of the invention.

FIG. 5 is a block diagram illustrating a computer system configured to modify and display tag clouds based on user preferences according to some embodiments of the invention. The computer system 500 can be deployed as a server from FIG. 1.

The computer system 500 includes a processor 502. The processor 502 is connected to an input/output controller hub 524 (ICH) also known as a south bridge. A memory unit 530 interfaces with the processor 502 and the ICH 524. The main memory unit 530 can include any suitable random access memory (RAM), such as static RAM, dynamic RAM, synchronous dynamic RAM, extended data output RAM, etc.

In one embodiment, the memory unit 530 includes a tag manager 531, a user profile repository 533, and the content manager 532. The content manager 532 includes code and other software required to display a website and an associated tag cloud. The tag manager 531 can access the user's profile repository 533 to determine the user's interests and personal preferences and accordingly select the most relevant tags. The content manager 532 can send these tags along with data and/or code to enable a client to display the website along with the tag cloud. The content manager 532 and tag manager 531 can repeat this process when users modify their profiles. Therefore, users can change their preferences on the fly and dynamically configure tag clouds to reflect their interests.

The ICH 524 connects and controls peripheral devices. In FIG. 5, the ICH 524 is connected to IDE/ATA drives 508 (used to connect external storage devices) and to universal serial bus (USB) ports 540. The ICH 524 may also be connected to a keyboard 512, a selection device 514, firewire ports 516 (for use with video equipment), CD-ROM drive 518, and a network interface 520. The ICH 524 can also be connected to a graphics controller 504. The graphics controller is connected to a display device (e.g., monitor).

In some embodiments, the computer system 500 can include additional devices and/or more than one of each component shown in FIG. 5 (e.g., video cards, audio cards, peripheral devices, etc.). For example, in some instances, the computer system 500 may include multiple processors, multiple cores, multiple external CPU's. In other instances, components may even be integrated or subdivided. In addition, embodiments may be embodied in an electrical, optical, acoustical or other form of propagated signal (e.g., carrier waves, infrared signals, digital signals, etc.), or wireline, wireless, or other communications medium.

Any of the embodiments may include a computer program product, or software, that includes a machine-readable medium having stored thereon instructions, which may be used to program a computer system (or other electronic devices) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

CONCLUSION

While the embodiments are described with reference to various implementations and exploitations, it will be understood that these embodiments are illustrative and that the scope of the inventive subject matter is not limited to them. In general, techniques for improving the accuracy of tag clouds are described herein and may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores can be rearranged, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting a request to display a tag cloud, wherein the tag cloud includes a plurality of tags, wherein the tags hyperlink to web content;
    determining interests of a user based on information provided by the user;
    determining, based on the information provided by the user, a first percentage value associated with a first interest of the user and a second percentage value associated with a second interest of the user;
    determining, based on the information provided by the user, a plurality of tags relevant to the interests of the user, the plurality of tags comprising a first group of the plurality of tags corresponding to the first interest and a second group of the plurality of tags corresponding to the second interest, wherein a first quantity of the first group of the plurality of tags constitutes the first percentage value of the plurality of tags and wherein a second quantity of the second group of the plurality of tags constitutes the second percentage value of the plurality of tags; and
    displaying the plurality of tags comprising the first group of tags and the second group of tags in the tag cloud.

2. The method of claim 1, wherein the information provided by the user is included in a user profile including one or more of the user's location, the user's age, the user's gender, and the interests of the user.

3. The method of claim 1, wherein determining the plurality of tags is based on one or more of the interests of the user, the attributes of a tagger, and attributes of an author of web content.

4. The method of claim 1, wherein displaying the plurality of tags comprises one or more of highlighting certain of the tags, selecting a font for some of the tags, and selecting a color for ones of the tags.

5. The method of claim 1, further comprising:
    clicking on one of the plurality of tags; and
    revealing associated links to website content, wherein the links to the content are customized based on the information provided by the user and the interests of the user.

6. The method of claim 1 further comprising:
    determining there is no user profile associated with the user;
    presenting an interface; and
    receiving the interests of the user via the interface.

7. The method of claim 1, wherein the information is included in a user profile associated with the user, the method further comprising:
    presenting an interface; and
    receiving an update to the information.

8. One or more machine-readable storage devices having stored therein a program product, which when executed by a set of one or more processor units causes the set of one or more processor units to perform operations that comprise:
    detecting a request to display a tag cloud, wherein the tag cloud includes a plurality of tags, wherein the tags hyperlink to web content;
    determining interests of a user based on information provided by the user;
    determining, based on the information provided by the user, a first percentage value associated with a first interest of the user and a second percentage value associated with a second interest of the user;
    determining, based on the information provided by the user, a plurality of tags relevant to the interests of the user, the plurality of tags comprising a first group of the plurality of tags corresponding to the first interest and a second group of the plurality of tags corresponding to the second interest, wherein a first quantity of the first group of the plurality of tags constitutes the first percentage value of the plurality of tags and wherein a second quantity of the second group of the plurality of tags constitutes the second percentage value of the plurality of tags; and
    displaying the plurality of tags comprising the first group of tags and the second group of tags in the tag cloud.

9. The one or more machine-readable storage devices of claim 8, wherein the information provided by the user is included in a user profile including one or more of the user's location, the user's age, the user's gender, and the interests of the user.

10. The one or more machine-readable storage devices of claim 8, wherein determining the plurality of tags is based on one or more of the interests of the user, the attributes of a tagger, and attributes of an author of web content.

11. The one or more machine-readable storage devices of claim 8, wherein displaying the plurality of tags comprises one or more of highlighting certain of the tags, selecting a font for some of the tags, and selecting a color for ones of the tags.

12. The one or more machine-readable storage devices of claim 8 further comprising:
    determining there is no user profile associated with the user;
    presenting an interface; and
    receiving the interests of the user via the interface.

13. The one or more machine-readable storage devices of claim 8, wherein the information is included in a user profile associated with the user, the method further comprising:
    presenting an interface; and
    receiving an update to the information.

14. An apparatus comprising:
    a memory comprising a program product; and
    a processor configured to execute the program product, the program product when executed causing the processor to perform operations that comprise:
        detecting a request to display a tag cloud, wherein the tag cloud includes a plurality of tags, wherein the tags hyperlink to web content;
        determining interests of a user based on information provided by the user;

determining, based on the information provided by the user, a first percentage value associated with a first interest of the user and a second percentage value associated with a second interest of the user;

determining, based on the information provided by the user, a plurality of tags relevant to the interests of the user, the plurality of tags comprising a first group of the plurality of tags corresponding to the first interest and a second group of the plurality of tags corresponding to the second interest, wherein a first quantity of the first group of the plurality of tags constitutes the first percentage value of the plurality of tags and wherein a second quantity of the second group of the plurality of tags constitutes the second percentage value of the plurality of tags; and displaying the plurality of tags comprising the first group of tags and the second group of tags in the tag cloud.

15. The apparatus of claim 14, wherein the information provided by the user is included in a user profile including one or more of the user's location, the user's age, the user's gender, and the interests of the user.

16. The apparatus of claim 14, wherein determining the plurality of tags is based on one or more of the interests of the user, the attributes of a tagger, and attributes of an author of web content.

17. The apparatus of claim 14, wherein displaying the tags comprises one or more of highlighting certain of the tags, selecting a font for some of the tags, and selecting a color for ones of the tags.

18. The apparatus of claim 14, wherein the operations further comprise:
  detecting a click on one of the plurality of tags; and
  revealing associated links to website content, wherein the links to the content are customized based on the information provided by the user and the interests of the user.

19. The apparatus of claim 14, wherein the operations further comprise:
  determining there is no user profile associated with the user;
  presenting an interface; and
  receiving the interests of the user via the interface.

20. The apparatus of claim 14, wherein the information is included in a user profile associated with the user, and wherein the operations further comprise:
  presenting an interface; and
  receiving an update to the information.

* * * * *